United States Patent Office 3,843,547
Patented Oct. 22, 1974

---

3,843,547
COMPOSITION FOR ACCELERATING OXYGEN REMOVAL COMPRISED OF AN AQUEOUS SOLUTION OF HYDRAZINE CONTAINING A MIXTURE OF AN ARYL AMINE COMPOUND AND A QUINONE COMPOUND
John D. Kaufman, Prospect, Henry W. Schiessl, Northford, and David A. Csejka, Orange, Conn., assignors to Olin Corporation
No Drawing. Filed Dec. 26, 1972, Ser. No. 318,287
Int. Cl. C02b 1/18; C23f 11/14
U.S. Cl. 252—184
17 Claims

ABSTRACT OF THE DISCLOSURE

The rapid removal of oxygen from oxygen-containing materials such as aqueous solutions or gases is accomplished by the use of a composition comprised of a mixture of an aqueous solution of hydrazine and a catalytic proportion of a mixture of an aryl amine compound and a quinone compound. The compositions of this invention are stabilized against discoloration and are particularly useful in the removal of oxygen from aqueous solutions such as boiler water, thereby inhibiting corrosion of the metal surfaces of the boiler.

---

This invention relates to compositions useful for the rapid removal of oxygen from liquids or gases.

It is known to use hydrazine compounds for the removal of oxygen from gases and liquids to inhibit or to reduce corrosion of metal surfaces. Commercially important is the use of hydrazine compounds in the treatment of water used in boilers and hot-water heating systems to inhibit or reduce corrosion. The general explanation given for the effect of the hydrazine compound in these applications is that it combines with oxygen present or dissolved in the material being treated according to the equation:

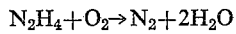

$$N_2H_4 + O_2 \rightarrow N_2 + 2H_2O$$

The rate of reaction of a hydrazine compound with oxygen at ambient or low temperatures, for example, below 60° C., is slow. It has therefore been proposed to add oxygen removal acceleration agents to increase the rate at which oxygen combines with the hydrazine compound at lower temperatures. U.S. Pat. No. 3,645,896, issued on Feb. 29, 1972, to A. L. Larsen, adds an imidazoline compound to hydrazine for oxygen removal in water-injection type oil wells. U.S. Pat. No. 3,551,349, issued on Dec. 29, 1970, to H. Kallfass, adds water soluble quinone compounds to aqueous solutions of hydrazine as activators in removing oxygen from water solutions. The quinone compound is added in a ratio by weight to hydrazine of from 1:1500 to 1:15.

One of the problems encountered by using certain prior art oxygen removal compositions containing hydrazine and an additive is that the treated solutions become discolored upon prolonged exposure to light or upon frequent exposure to air, for example, when a container is frequently opened and closed.

It is a primary object of the present invention to provide a composition for and a method of rapidly removing oxygen from oxygen-containing materials.

It is a further object of this invention to provide a novel composition for inhibiting corrosion or degradation of metals by rapidly removing oxygen from oxygen-containing materials in contact with said metals.

An additional object of the present invention is to provide a color stabilized novel composition for the rapid removal of oxygen from oxygen-containing materials.

Another object of the present invention is to provide a novel composition for the rapid removal of oxygen from aqueous solutions in contact with metal surfaces.

Still another object of the invention is to provide a method of rapidly removing oxygen from aqueous solutions in contact with metal surfaces.

These and other objects of the invention will be apparent from the following detailed description of the invention.

It has now been discovered that the aforesaid objects are accomplished by admixing an aqueous hydrazine solution with a catalytic proportion of a mixture of an aryl amine compound and a quinone compound to form a novel composition capable of rapidly removing oxygen from oxygen-containing materials. When this novel composition is further admixed in an effective proportion with an oxygen-containing material, a rapid removal of oxygen therefrom is effected, and corrosion of metal surfaces in contact with the thus treated oxygen-containing material is inhibited.

In addition, it has been found that the novel compositions of the present invention do not become discolored upon prolonged exposure to light or upon frequent exposure to air.

More in detail the aryl amine compound employed in the novel composition of the present invention is selected by the group consisting of aminophenol, N-alkyl aminophenol, wherein the alkyl contains from 1 to about 4 carbon atoms, toluene diamine, phenylene diamine and any of the above amine compounds substituted with a sulfate group.

Examples of suitable aryl amine compounds include:

o-phenylene diamine  m-aminophenol
p-phenylene diamine  p-aminophenol
2,3-toluene diamine  p-aminophenol sulfate
2,6-toluene diamine  p-(N-methylamino)phenol sulfate
2,4-toluene diamine  o-(N-butylamino)phenol The quinone compounds suitable as a stabilizing agent in the composition of the present invention is selected from the group consisting of quinone, naphthoquinone and anthraquinone and their hydroxyl forms, for example, pyrocatechal or hydroquinone. Preferred compounds are the hydroxyl forms of the quinones, for example, hydroquinone.

In the novel composition of the present invention, the catalytic proportion of the mixture of an aryl amine compound and a quinone compound contains a ratio by weight of the aryl amine compound to the quinone compound of from about 10:1 to about 300:1 and preferably from about 15:1 to about 200:1. The catalytic proportion is added to provide a weight ratio of hydrazine to the quinone compound from about 2000:1 to about 10,000:1, and preferably from about 2200:1 to about 8000:1.

While the exact mechanism through which the removal of oxygen by hydrazine is accelerated by the mixture of aryl amine compound and quinone compound is not clearly understood, it is believed that the mixture truly acts as a catalyst. A catalytic proportion is the amount of the mixture of aryl amine compound and quinone compound capable of accelerating the removal of oxygen. In the novel composition of this invention, a catalytic proportion of the mixture is generally equivalent to a weight ratio of hydrazine to the mixture of from about 40:1 to about 1500:1 and preferably from about 50:1 to about 150:1 but greater ratios of the hydrazine to the mixture may be employed, if desired.

Generally, the aqueous solution of hydrazine used has a concentration of about 5 to about 65 percent by weight of hydrazine and preferably from about 20 to about 50 percent by weight of hydrazine. With an aqueous solution containing about 35 percent by weight of hydrazine, from about 0.23 to about 0.70 percent by weight of the mixture of aryl amine compound and the quinone compound is employed to accelerate oxygen removal.

The novel composition is used in an effective proportion in the novel method of this invention to accelerate oxygen removal from oxygen-containing materials in either liquid or gaseous form. In the novel method of this invention, an effective proportion of the novel composition is admixed with the oxygen-containing material by a suitable mixing technique such as mechanical agitation or the like in order to maintain the oxygen concentration at a low level. For example, at room temperature and pressure, a boiler water solution saturated with oxygen in atmosphere of air contains about 8 to 9 parts of oxygen per million. This boiler water solution may be treated by the novel method of this invention to reduce the oxygen concentration to a range from about 1 to 10 parts per billion at operating conditions.

Generally when the oxygen-containing material to be treated with the novel composition and novel method of this invention is a liquid, a sufficient proportion of the above-described novel composition is added to the liquid to maintain a hydrazine concentration in the liquid of between about 0.03 and about 1000, and preferably between about 0.05 anud about 600 parts of hydrazine per million parts of liquid. Greater proportions may be employed if desired. These proportions have been found to be effective in the treatment of boiler water in a boiler operated at pressures up to about 400 atmospheres, and at temperatures ranging from about 25° C. to about 600° C. However, the same proportions may be used in refrigeration systems at temperatures of 25° C. down to about 0° C. or less.

The novel composition and method of the present invention are used, for example, not only to rapidly accelerate the removal of free oxygen from liquids such as water solutions used in boilers but also in hot water systems, oil wells using water injection systems, solutions of glycol ethers, heterocyclic oxygen-containing compounds such as furan or sodium dibutyl dithiocarbamate, and the like. Effective control of the oxygen content of these liquids is obtained by admixing the novel composition of this invention with the oxygen-containing solution in the proportions described above. Since hydrazine is consumed during oxygen removal, the concentration of the treated liquid should be determined periodically and additional novel composition should be added to the treated liquid in order to maintain the conventration of hydrazine in the mixture of aryl amine compound and quinone compound in the liquid within the above-identified proportions.

When the oxygen-containing material being treated is a gas such as ammonia, hydrogen and other gases inert to hydrazine, oxygen reduction and/or removal from the gas can be obtained by scrubbing the oxygen-containing gas in the novel composition of this invention having hydrazine and concentrations of a mixture of aryl amine compound and quinone compound within the above-identified ranges. Scrubbbing of the gas can be effected in a suitable scrubber, preferably where the oxygen-containing gas in finely divided form is dispersed in the hydrazine solution.

Removal of oxygen from liquid and gas using the novel method and novel composition of this invention provides oxygen-free liquids and gas which may be contacted with metal surfaces in boilers, ducts, pipes and the like, without corrosion of these metal surfaces caused by free oxygen being present in the liquids and gas.

Although the invention has been described using aqueous hydrazine solution as a component of the novel composition, those skilled in the art will recognize that aqueous solutions of inorganic and organic hydrazine compounds can be employed to replace part or all of the aqueous hydrazine solution used in the proportions described above. Typical examples of suitable inorganic hydrazine compounds include:

hydrazine phosphate
hydrazine mono- and dihydrochloride
hydrazine mono- and dihydrobromide
mono- and dihydrazine sulfate, and
hydrazine sulfite Examples of suitable organic hydrazine compounds include lower mono- and dialkylhydrazines such as methyl hydrazine          butyl hydrazine
ethyl hydrazine           1,1-dimethyl hydrazine, and
propyl hydrazine          1,1-dibutyl hydrazine In addition, salts such as phosphates or sulfates of the above organic hydrazine compounds may be used.

The following examples are presented to further illustrate the invention without any intention of being limited thereby. All parts and percentages are by weight unless otherwise specified.

EXAMPLES 1–10

Mixtures of an aryl amine compound and a quinone compound of the type described above and as identified below in the table as Examples 1–10, respectively, were each admixed with an aqueous hydrazine solution and then admixed with portions of an aqueous solution saturated with free oxygen in a flask in order to demonstrate the effectiveness of the novel composition and method of this invention. In each example, to a solution containing 1500 p.p.m. of hydrazine was added an appropriate amount of the aryl amine compound and hydroquinone to give a stock solution having a concentration of the mixture of aryl amine compound and hydroquinone ten times greater than that desired in the test. One part of this solution was then admixed with 9 parts of water saturated with oxygen at a temperature of 25° C. and buffered to a pH of 10 to give an aqueous solution containing 150 p.p.m. of hydrazine and a mixture of the aryl amine compound and quinone compound in the proportions shown in Table I below. The water saturated with oxygen was buffered with a 0.2 molar solution of boric acid, sodium hydroxide and potassium chloride. Oxygen removal was determined by a polarographic method over a period of about ten minutes. The results for the percent of oxygen removed after intervals of 2, 4, 6, 8 and 10 minutes for example are given in Table I.

For purposes of comparison, the procedure of Examples 1–10 was repeated except that only hydroquinone without an aryl amine compound was added to the aqueous solution saturated with oxygen. The percent oxygen removed was determined after intervals of 2, 4, 6 and 10 minutes and the results are presented below in Table I under Examples C–1 and C–2. Also, for purposes of comparison, the procedure of Examples 1–10 was repeated except that only hydrazine, without the mixture of aryl amine compound and hydroquinone, was added to the aqueous solution saturated with oxygen. The percent oxygen removed was determined after intervals of 2, 4, 6 and 10 minutes and the results are presented below in Table I under Example C–3.

TABLE I

Percent oxygen removed from aqueous solutions containing 150 p.p.m. hydrazine at 25° C. and pH of 10

| Example | Aryl amine compound Amine | P.p.m. | Hydro-quinone p.p.m. | Percent oxygen removed | | | | |
|---|---|---|---|---|---|---|---|---|
| | | | | 2 min. | 4 min. | 6 min. | 8 min. | 10 min. |
| 1 | p-Aminophenol | 1 | 0.02 | 33 | 50 | 63 | 78 | 90 |
| 2 | do | 1 | 0.06 | 43 | 62 | 77 | 87 | >95 |
| 3 | do | 3 | 0.02 | 46 | 64 | 80 | 91 | >95 |
| 4 | do | 3 | 0.06 | 45 | 65 | 79 | 90 | 95 |
| 5 | p-(N-methylamino)phenol sulfate | 1 | 0.02 | 44 | 68 | 86 | >95 | |
| 6 | do | 1 | 0.06 | 49 | 73 | 86 | 94 | >95 |
| 7 | do | 3 | 0.02 | 52 | 76 | 91 | >95 | |
| 8 | do | 3 | 0.06 | 68 | 90 | >95 | | |
| 9 | p-Aminophenol sulfate | 1 | 0.02 | 48 | 67 | 82 | 89 | 92 |
| 10 | do | 3 | 0.06 | 64 | 85 | 94 | 95 | |
| C-1 | None | | 0.02 | 24 | 38 | 52 | | 74 |
| C-2 | do | | 0.06 | 11 | 17 | 22 | | |
| C-3 | do | | 0.00 | 10 | 21 | 41 | | 60 |
| C-4 | p-(N-methylamino)phenol sulfate | 3 | 0.00 | 59 | 84 | 92 | | 95 |

These data show that the novel compositions of this invention comprised of a mixture of aqueous hydrazine and the catalytic proportion of a mixture of the specified aryl amine compounds and hydroquinone in the proportions specified, removed a significant proportion of the free oxygen, greater than 90 percent after contact for 10 minutes. In view of this effective, removal of oxygen from the water, the resulting treated water could be contacted with metal surfaces for extended periods without causing substantial corrosion.

Observations of the stock solutions used in Examples 1–10 showed that the novel composition of the invention remained colorless upon exposure to light and contact with air while the solution of Comparative Test C–4 containing only the aryl amine became discolored under these same conditions of exposure to light and air.

Observations of the data further show that there appears to be a synergistic effect of combining the hydrazine, hydroquinone and aryl amine compound with respect to the speed of removing oxygen from the oxygen-saturated solutions. Comparative Test C–3 shows that the use of hydrazine alone requires 10 minutes to remove 60 percent of the oxygen and Comparative Tests C–1 and C–2, which each use hydrazine and trace proportions of hydroquinone, require at least 10 minutes to remove 74 percent of the oxygen. Comparative Test C–4, which uses hydrazine and an aryl amine compound, without any hydroquinone, requires 10 minutes to remove 95 percent of the oxygen. In contrast, Example 8, which uses hydrazine in the same proportion as Comparative Test C–3, hydroquinone in the same proportion as C–2 and aryl amine compound in the same proportion as C–4, resulted in removal of greater than 95 percent oxygen in 6 minutes.

What is claimed is:

1. An oxygen-scavenging composition consisting essentially of an aqueous solution of hydrazine containing a catalytic proportion of a mixture of
   (a) an aryl amine compound selected from the group consisting of
      (1) aminophenol
      (2) N-alkyl aminophenol wherein the alkyl group contains from 1 to about 4 carbon atoms
      (3) toluene diamine
      (4) phenylene diamine, and
      (5) sulfates of said aryl amine compound of a(1)–a(4)
   (b) a quinone compound selected from the group consisting of
      (1) quinone
      (2) naphthoquinone
      (3) anthraquinone, and
      (4) hydroxy substituted quinone of b(1)–b(3)
   (c) wherein the weight ratio of said aryl amine compound to said quinone compound is from about 10:1 to about 300:1, and
   (d) the weight ratio of said hydrazine to said quinone compound is from about 2000:1 to about 10,000:1.

2. The composition of claim 1 wherein said aqueous hydrazine solution contains from about 5 to about 65 percent by weight of hydrazine.

3. The composition of claim 2 wherein the weight ratio of said hydrazine solution to said mixture of said aryl amine and said quinone compound is from about 40:1 to about 1500:1.

4. The composition of claim 3 wherein said aqueous hydrazine solution contains from about 20 to about 50 percent by weight of hydrazine.

5. The composition of claim 4 wherein said weight ratio of said aryl amine compound to said quinone compound is from about 15:1 to about 200:1, and the weight ratio of said hydrazine to said quinone compound is from about 2200:1 to about 8000:1.

6. The composition of claim 5 wherein the weight ratio of said hydrazine solution to said mixture of said aryl amine compound and said quinone compound is from about 50:1 to about 150:1.

7. The composition of claim 6 wherein said aryl compound is p-aminophenol.

8. The composition of claim 6 wherein said aryl compound is p-(N-methylamino)phenol sulfate.

9. The composition of claim 6 wherein said quinone compound is hydroquinone.

10. The composition of claim 6 wherein said aryl compound is p-aminophenol sulfate.

11. The composition of claim 6 wherein said aryl compound is toluene diamine.

12. The method of removing oxygen from an oxygen-containing water solution which comprises admixing said water solution with an effective proportion of the composition of claim 2 comprised of an aqueous solution of hydrazine containing a mixture of an aryl amine compound and a quinone compound said effective proportion being sufficient to provide a concentration of said hydrazine in said water solution of from about 0.03 to about 1000 parts per million parts of water.

13. The process of claim 12 wherein said effective proportion is a concentration of said hydrazine of from about 0.05 to about 600 parts per million parts of water.

14. The method of claim 13 wherein said aryl amine compound is p-aminophenol.

15. The method of claim 13 wherein said aryl amine compound is p-(N-methylamino)phenol sulfate.

16. The method of claim 13 wherein said aryl amine compound is toluene diamine.

17. The method of claim 13 wherein said quinone compound is hydroquinone.

References Cited
UNITED STATES PATENTS
| | | | |
|---|---|---|---|
| 3,551,349 | 12/1970 | Kallfass | 252—392 |
| 3,625,888 | 12/1971 | Redmore et al. | 252—188 |
| 3,728,281 | 4/1973 | Marks et al. | 252—188 |
| 3,764,548 | 10/1973 | Redmore | 252—188 |
| 3,770,055 | 11/1973 | Larsen | 252—392 |

FOREIGN PATENTS
| | | | |
|---|---|---|---|
| 43,821 | 12/1971 | Japan | 252—188 |

STEPHEN J. LECHERT, JR., Primary Examiner

I. GLUCK, Assistant Examiner

U.S. Cl. X.R.

21—2.5 R, 2.7 R; 210—63; 252—181, 188, 8.55 E, 392, 393, 403, 404